Sept. 5, 1961     W. A. LAWSON ET AL     2,998,623
CHEEK PLATES FOR MILL AND CALENDER PRESS ROLLS Filed Feb. 25, 1960     2 Sheets-Sheet 1

INVENTORS
W. W. HARRIS
W. A. LAWSON
By Fetherstonhaugh & Co.
ATTORNEYS

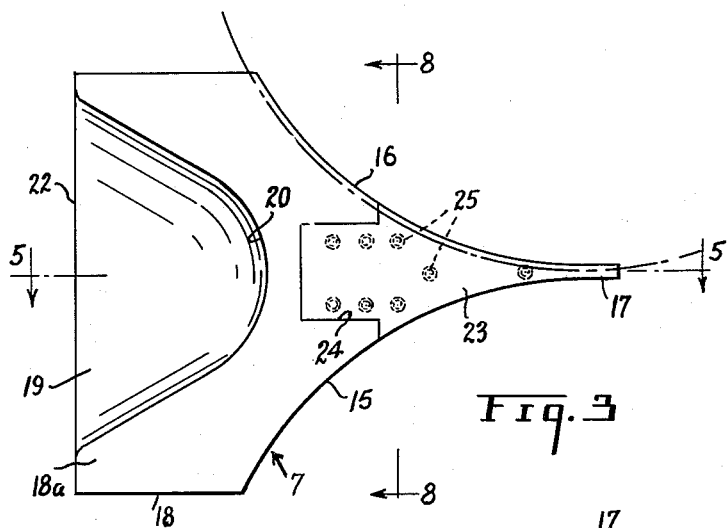
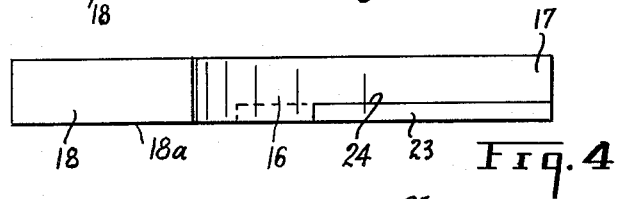
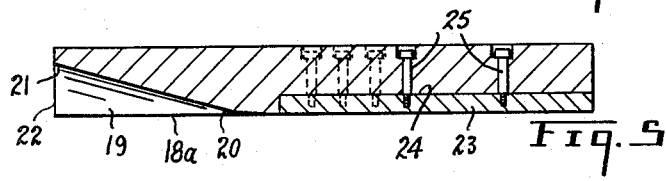
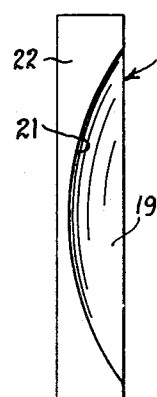 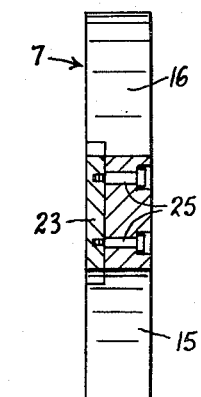 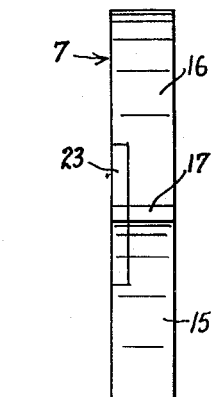
INVENTORS
W. W. HARRIS
W. A. LAWSON
By Heatherstonhaugh Co.
ATTORNEYS

United States Patent Office 2,998,623
Patented Sept. 5, 1961.

2,998,623
CHEEK PLATES FOR MILL AND CALENDER PRESS ROLLS
William A. Lawson, Cote St. Luc, Quebec, and William W. Harris, Hamilton, Ontario, Canada, assignors to Building Products Limited, Montreal, Quebec, Canada
Filed Feb. 25, 1960, Ser. No. 10,986
4 Claims. (Cl. 18—9)

This invention relates to improvements in milling and calender machines for forming sheets and particularly to means whereby a relatively thick mat of loosely bonded plastic stock material is prevented from spreading sideways as the mat approaches and passes through the nip of the mill and calender rolls where the mat is reduced in thickness and is surfaced finished.

The invention consists essentially in the provision of a pair of cheek plates between which the mat of plastic material being fed to the nip of the mill rolls and the calender rolls is constrained to a fixed width, with a portion of the cheek plates extending through the nip of the rolls in order to control the width of the mat at and beyond the nip. The cheek plates are also provided with means to mould and guide the relatively ragged edges of the mat into the limiting width between the cheek plates.

In the production of floor tiles and such like material from synthetic hydrocarbon resins, asphalt or vinyl products, the stock material is fed from a mixing mill in the form of a loosely packed mat. This mat of loosely bonded stock material has relatively uneven edges as it leaves the mill, the unevenness of the edges amounting to a few inches of the sheet width after calendering. Furthermore, the mat of loose pack material is often cut and folded back on itself before it reaches the calender rolls, causing further unevenness at the edges of the calendered sheet. As such a mat approaches and enters the nip of the calender rolls and is reduced to tile thickness, the material tends to flow sideways causing the edges to tear or flow unevenly and further enlarging the indentations at the edges of the mat and at the same time causing the sheet, for a considerable distance inwards of its edges, to vary in thickness from the desired tile thickness. All of this results in a very large loss in production as in many cases the outer run of tiles at the cutting stage in production have to be discarded as waste and be turned to the batch mixer for reprocessing.

The effect of the use of cheek plates which are the subject of the present invention is to dam the sideways flow of the material as it is reduced in thickness by calendering. If the sheet is approximately as wide as the distance between the cheek faces, the effect is one of evening out the reduction and compression forces by providing a restriction to uncontrolled stock flow at the edges. The edge flow characteristics therefore more clearly resemble those at the centre of the sheet and the result is that the sheet thickness is the same, or closely so, across the whole width of the sheet. A further effect of the cheek plates being directed into and through the nip are that the sheet comes out of the calender with straighter edges. The flow of the plastic material is such that edge gaps are mended or filled so that very few, if any, tiles at the cutting stage are rejected as waste.

The object of the invention is to eliminate the large amount of waste at the edge of plastic material after calendering.

A further object of the invention is to provide means whereby a mass of loose packed plastic material is guided into a limited width when passing through the nip of mill rolls or of a calender press.

A further object of the invention is to provide means whereby the mass of plastic material approaching the nip of a calender press is compacted at the edges to ensure a uniform thickness across the width of the sheet as it leaves the nip of the calender.

A further object of the invention is to provide cheek plates which will seal the gap through the nip of a mill or calender press at a predetermined transverse width to prevent sideways flow of the material passing through the nip.

These and other objects of the invention will be apparent from the following detailed specification and the accompanying drawings, in which:

FIGURE 3 is a side elevation of the left hand cheek plate as seen in FIGURE 2.

FIGURE 4 is a plan view of the cheek plate.

FIGURE 5 is a horizontal section of the cheek plate on the line 5—5 of FIGURE 3.

FIGURE 6 is a vertical end view of the left hand end of the cheek plate as seen in FIGURE 3.

FIGURE 7 is a vertical end view of the right hand end of the cheek plate as seen in FIGURE 3.

FIGURE 8 is a vertical section of the cheek plate taken on the line 8—8 of FIGURE 3.

The invention is hereinafter described as being applied to the calender machine rolls. However, it is to be understood that the invention can be applied to any pair of rolls through which a plastic material is passed to be reduced in thickness and have its surface made smooth. In this connection it is to be understood that, in the forming of the mat of plastic material, the invention could be applied at the mill rolls ahead of the calender rolls, as well as at the calender rolls.

Figure 1:
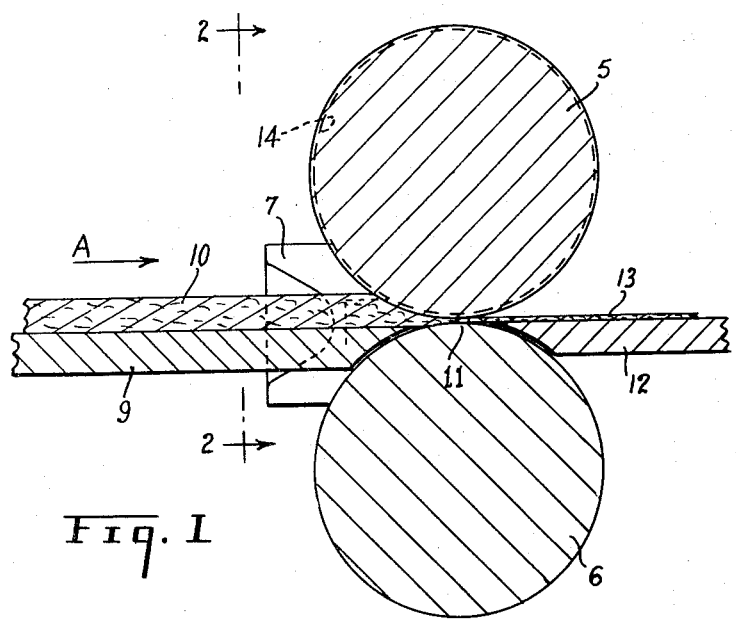
FIGURE 1 is a vertical longitudinal section of the calender press rolls showing in diagrammatic form the passage of a mass of plastic material passing through the nip of the press rolls and the location of the cheek plates at the roll nip.
Figure 2:
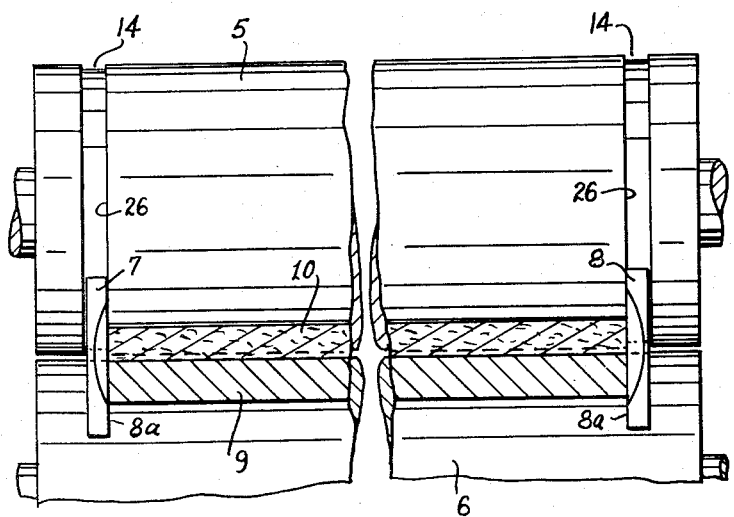
FIGURE 2 is a vertical transverse section taken on the line 2—2 of FIGURE 1.

Referring to the drawings, the press roll section of a calender machine is shown in diagrammatic form only in FIGURES 1 and 2 and consists of the top press roll 5 and the bottom press roll 6, a left hand cheek plate 7 and a right hand cheek plate 8. A stock support table 9 supports the mat of plastic material 10 being fed towards the nip 11 of the calender press rolls 5 and 6 and a support table 12 supports the finished calender product 13 as it leaves the calender rolls 5 and 6.

The top calender roll 5 is provided with a pair of annular grooves 14 adapted to receive the top forward edge of the cheek plates 7 and 8 and to permit the cheek plates to penetrate beyond the nip 11 of the rolls 5 and 6.

The cheek plates 7 and 8 are made for left hand and right hand mounting on the calender machine, looking in the direction of the arrow A in FIGURE 1. The cheek plates 7 and 8 are identical except for the right and left hand feature and have their forward ends formed with a bottom curved edge 15 whose radius coincides with the radius of the bottom calender roll 6 and an upper curved edge 16 whose radius coincides with the radius of the bottom surface of the annular groove 14 of the upper calender roll 5.

Both curved edge surfaces 15 and 16 merge into a tip portion 17 projecting forwardly for a short distance beyond the vertical axis of the two curved edge surfaces 15 and 16 and beyond the nip 11 of the rolls 5 and 6 when the cheek plates are assembled on the calender in the position shown in FIGURE 1.

The rearwardly projecting portion 18 of the cheek plates 8 have their inwardly facing surfaces 18a cut back at 19. The forward edge of the cut back portions 19 have a radial edge 20 whose axis is in a horizontal plane coincident with a line passing through the middle of the tip portion 17 of the cheek plates. The rear edge of the cut back portion 19 also has a radial edge 21 whose axis is in the same horizontal plane as the radial edge 20 and in the vertical plane of the end 22 of the cheek plate. The two radial edges 20 and 21 are joined together by surfaces which form a guide, directing and packing the rough indented edges of the plastic material 10 inwards towards that portion of the nip 11 defined transversely by the tip portions 17 of the cheek plates.

As the plastic material 10 normally has abrasive characteristics, the inward facing surfaces 18a can be reinforced along a horizontal line leading into the nip 11 of the calender rolls 5 and 6, and is here shown as being reinforced by the plate 23. This plate 23 could be of hardened steel or an alloy which will resist the abrasive effect of the plastic material 10 and is secured in place in the recessed portion 24 of the cheek plates 7 and 8 by means of the stud bolts 25. These plates 23 have their upper and lower edges coinciding with the curved surfaces 15 and 16 of the cheek plate and are projected forwardly to form the inner facing surface of the tips 17.

When the cheek plates 7 and 8 are mounted in place in the calender section of the machine, as shown in FIGURES 1 and 2, their inner faces 18a are placed close to the inner radial surface 26 of the annular grooves 14 in the top roll 5, in order to exclude, as much as possible, the plastic material 10 from entering the annular grooves 14.

It will be realized that, when the finished product 13 is to be varied in thickness, the nip 11 between the rolls 5 and 6 is varied accordingly. In such a case the cheek plates also are changed to ones having a tip 17 equal to the height of the nip between rolls 5 and 6 plus the depth of the annular grooves 14.

The cheek plates can be mounted on the calender machine in any suitable manner such as on the side of the table 9 or on specially constructed brackets on the machine frame.

By the use of cheek plates on the infeed side of a calender press, with the tips of the cheek plates passing through the nip of the press roll for a short distance beyond the vertical axis of the rolls, the loose compounded stock normally having broken and indented edges as it moves forward from the mill to the nip of the calender, is moulded and compacted into a nip area having a well defined width, with the result that the finished product as it passes out of the nip of the calender rolls is of a uniform thickness across its full width and has straight edges formed by the cheek plates. The resulting product can then be cut into standard tile squares with a minimum of trim edge at the outer edge of the sheet as it comes from the calender. By compacting the forwarding moving stock between the cheek plates, more of the stock is converted into usable sheet stock for cutting tile.

What we claim is:

1. In a machine having a pair of press rolls together forming a nip for reducing a plastic material to a sheet having a predetermined thickness, width and density, at least one of said rolls having a pair of spaced apart annular grooves cut in its peripheral surface, and a pair of cheeck plates associated with and projecting through the nip of said press rolls, the said cheek plates having their edges radiused to bear on the peripheral surfaces of said rolls at the location of said annular grooves, the said cheek plates having their opposing face surfaces tapered generally in a plane at right angles to the plane of the axis of the press rolls to form guideways of reduced width in the direction of the nip of the press rolls.

2. In a machine having a pair of press rolls together forming a nip for reducing a plastic material to a sheet having a predetermined thickness, width and density, at least one of said rolls having a pair of spaced apart annular grooves cut in its peripheral surface, and a pair of cheeck plates associated with and projecting through the nip of said press rolls, the said cheek plates having their edges radiused to bear, one radiused edge in the annular grooves in one of said press rolls and the other radiused edges on the peripheral surface of the other of said press rolls, the said cheek plates having their opposing face surfaces tapered generally in a plane at right angles to the plane of the axis of the press rolls to form guideways of reduced width in the direction of the nip of the press rolls.

3. In a machine as set forth in claim 1, in which the tapered surface of the cheek plates are concave.

4. In a machine as set forth in claim 1, in which the opposing surfaces of the cheek plates are recessed in that portion of the cheek plates approaching and passing through the nip of the press rolls, and a reinforcing plate is mounted in the recess of each cheek plate.

References Cited in the file of this patent

UNITED STATES PATENTS

| | | |
|---|---|---|
| 1,277,729 | Kearns | Sept. 3, 1918 |
| 1,341,422 | Gaisman | May 25, 1920 |
| 2,513,541 | Winegar et al. | July 4, 1950 |
| 2,599,218 | Austin | June 3, 1952 |
| 2,919,466 | Roemer | Jan. 5, 1960 |
| 2,932,852 | Melville et al. | Apr. 19, 1960 |